United States Patent Office 2,983,710
Patented May 9, 1961

2,983,710

POLYMERIZED α-MONO-OLEFINS STABILIZED WITH 2-TERT. BUTYL-4-HIGHER ALKOXY-PHENOLS

Clarence E. Tholstrup and Alan Bell, Kingsport, Tenn., assignors to Eastman Kodak Company, Rochester, N.Y., a corporation of New Jersey No Drawing. Filed Sept. 19, 1957, Ser. No. 684,865

7 Claims. (Cl. 260—45.95)

This invention relates to stabilized compositions of matter which are normally subject to oxidative deterioration such as paraffin wax, lard, fuel oils, citrus oils, motor fuels, rubber, synthetic resins, cottonseed oil, vitamin A, sausage, cod liver oil, lubricants, etc. In particular, this invention pertains to a stabilized composition of matter normally subject to thermal oxidative degradation comprising a normally solid polymerized α-mono-olefin containing from 2 to 8 carbon atoms and from about 0.001% to about 3% by weight of a stabilizer selected from the group consisting of those compounds having the following formulas:

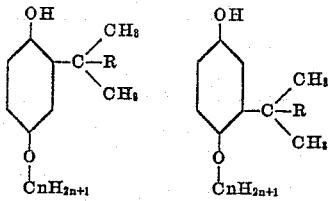

wherein $n$ is an integer of from 10 to 20 and R represents an alkyl radical containing from 1 to 5 carbon atoms.

The prior art is replete with disclosures as to the use of 2 or 3-tert. butyl-4-methoxyphenol (known commercially as butylated hydroxyanisole or BHA) as an antioxidant or stabilizer for compositions subject to oxidative deterioration. However, none of this art teaches that the use of homologs of BHA is significantly superior to BHA itself. In fact the art usually indicates that BHA is the preferred compound. Moreover, experimental data derived from testing various homologs of BHA shows that there is usually little to be gained and ordinarily something worthwhile is lost in the use of various homologs related to BHA; e.g., see data in U.S. Patent 2,310,710.

Although BHA has met with considerable commercial success as a stabilizer for various substrates it has no outstanding properties in polymerized α-mono-olefins. Other stabilizers used in polyethylene, polypropylene and the like have not been fully satisfactory for all purposes, particularly as regards thermal oxidative degradation.

It was quite unobvious to find that certain rather high homologs of BHA were quite effective to a surprisingly worthwhile degree in stabilizing polyethylene in particular and also other polymerized α-mono-olefins.

It is an object of this invention to provide stabilized compositions of matter normally subject to oxidative deterioration.

It is a further object to provide polymerized α-mono-olefins, especially polyethylene, which have excellent stability under conditions conducive to oxidative degradation.

It is another object to provide hot plastic compositions including polyethylene, polypropylene or the like, especially polyethylene, which are reasonably stable and can be extruded into fibers, into sheets, onto wire, or coated onto fabric, paper, metal, or otherwise fabricated into solid form from the hot plastic stage without substantial oxidative degradation.

Other objects will become apparent hereinafter.

These and other objects can be accomplished in accordance with one embodiment of this invention which provides a stabilized plastic composition at a temperature above 140° C. which is normally subject to thermal oxidative deterioration comprising a normally solid polymerized α-mono-olefin containing from 2 to 8 carbon atoms and from about 0.001% to about 3% by weight of a stabilizer selected from the group consisting of those compounds having the following formulas:

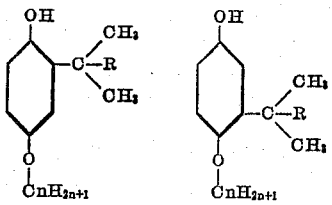

wherein $n$ is an integer of from 10 to 20 and R represents an alkyl radical containing from 1 to 5 carbon atoms.

These plastic compositions can advantageously contain other components as may be desired from a consideration of the end use. Thus, mixtures of polyethylene and paraffin wax may be used for coating paper. Moreover, the particular higher homologs of BHA covered by this invention can be used alone or together with other antioxidants in paraffin wax containing little or no polyethylene or other polymerized α-mono-olefin; however, the results are not of anywhere near the same order as can be achieved according to this invention. In fact, it will become apparent from the data below that polyethylene is peculiar in its great receptivity to thermal stabilization by the compounds described herein. Although there is also considerable receptivity to such stabilization on the part of other poly-α-mono-olefins such as polypropylene, etc., the unusually good results regarding stabilization of polyethylene show that the stabilized polyethylene of this invention stands apart as being without an equivalent in the art.

The preferred stabilizers of this invention are illustrated in the tables given below. The tertiary alkyl group is preferably in the 2-position and can advantageously be either a tert.butyl or a tert.octyl radical; however it can also be tert.amyl, tert.hexyl, etc. The $C_nH_{2n+2}$ radical can be either a straight chain alkyl radical or a branched chain alkyl radical. The value of $n$ can be a little below or above the range specified but the stabilizer characteristics even when $n$ is 10 are quite inferior to the characteristics in the especially preferred range where $n$ is from 12 to 18.

The polymerized α-mono-olefins which can be effectively stabilized by this invention are normally solid polymers such as polyethylene, polypropylene, poly-3-methylbutene-1, poly-3,3-dimethylbutene-1, polypentene-1, poly-4-methylpentene-1, poly-4,4-dimethylpentene-1 and other homologous polymers including various mixtures and some copolymers. Howevers, this invention does not contemplate the stabilization of synthetic rubber which may include copolymers of α-monoolefins.

This invention applies to solid polymers of ethylene and the isotactic and syndiotactic polymers of the other α-mono-olefins including isotactic polystyrene. This invention is not intended to cover the atactic polymers such as elastomeric copolymers of isobutylene produced by peroxide catalyzed polymerization techniques. As mentioned above, polyethylene is especially receptive to the stabilizing action of the stabilizers covered by this invention.

In a common process of extruding molten polyethylene into film form, flakes or pellets of polyethylene are fed continuously into a melt extrusion machine, and the molten film continuously extruded through a slot orifice. Usually, the polyethylene is extruded from a melt maintained at a temperature of 150° to 325° C. Tubing is usually extruded from a melt at a temperature of within the range of from about 200° to 250° C. whereas film is extruded at a temperature of usually well above 200° C., e.g. at 250–325° C. Paper coating operations may be run at 300° C. or higher. An alternative process of forming a polyethylene film comprises milling molten polymer on closely spaced heated calendar rolls to form a film which is conducted vertically downward for further processing. In either of these general methods of forming a polymeric film, tubing or coating, the temperature employed might be advantageously increased so as to achieve increased rapidity in the processing operation whereby the cost of operations could be substantially reduced. However, degradation at high temperatures imposes limitations upon the temperatures which can be used.

Operations at high temperatures are limited by the necessity for shutting down the processing equipment for cleaning out the degraded products which accrue over a period of time at the high temperature employed. Obviously, it is not practical to operate at a temperature which requires frequent shut-downs. Similar considerations are involved in the molding of polyethylene and in other forming operations involving high temperatures.

In addition to the high temperatures employed during processing operations, polyethylene is also employed in many electrical and other applications where the use of temperatures in the range of 50–90° C. is fairly common upon a continuous basis whereby the breakdown rates are by no means insignificant. Thus, the heat stabilizers of the present invention are quite efficacious in polyethylene insulation for electrical wire which is to be subjected to continuous temperature on the order of 50–60° C. or higher as in motors or the wiring of some electronic devices. The electrical properties, especially the dielectric power loss factor, of polyethylene are particularly sensitive to oxidative breakdown occurring in processing or use.

Other matters relating to the stabilization of poly-α-mono-olefins are set forth in greater detail in a copending application filed July 8, 1957 by Tholstrup and Tambyln, Ser. No. 670,375, wherein similar results are discussed involving the use of zinc or possibly cadmium dialkyldithiocarbamates as stabilizers against thermal degradation.

Although the stabilizers of the present invention can be used in amounts below about 0.001% or higher than about 5% by weight, it is generally advantageous to use them in amounts of from about 0.1% to about 2% by weight. Additional antioxidants or synergistic compounds can also be present which may further enhance the stability of the poly-α-mono-olefin against various degradative effects, e.g. propyl gallate, dodecyl gallate, octadecyl gallate, 2,6-ditert.butyl-4-methylphenol, zinc dibutyldithiocarbamate, and/or any of the known stabilizers for polymers of α-mono-olefins.

In order to further illustrate this invention various examples are presented such as in the tables set forth below. A thermal stability test has been developed to serve as an accelerated procedure to measure the storage life of poly-α-mono-olefins such as polyethylene at an elevated temperature. The oven life of the stabilized polymer is expressed in the tables below as the number of hours at 140° C. before the peroxide build-up takes place in the sample being tested. The details of this procedure as it is applied to polyethylene or the other polymers such as polypropylene can be described as follows wherein the stabilizers of this invention are referred to as antioxidants since this term appears to cover their principal function:

DESCRIPTION OF OVEN STABILITY TEST FOR POLYETHYLENE

Part A.—Preparation of master batch

A master batch of antioxidant-treated polyethylene is prepared by milling 1% by weight of the test antioxidant with polyethylene as follows: 148.5 grams polyethylene +1.5 grams antioxidant is milled on rollers maintained at 240° and 210° F. for six minutes, cutting, folding, and blending constantly to give a uniform sample. Other samples may be prepared by blending a portion of this master batch with untreated polyethylene to give a lesser antioxidant concentration. The polyethylene may be tested as it comes from the rollers or it can be pressed into 1/16-inch plates at 140° C. getting rid of any air bubbles present and making it easier to handle.

Part B.—Measurement of thermal stability by oven stability test

Six 0.25-gram samples of the master batch are placed in a forced air oven heated to 140° C. throughout the test. At intervals one of these samples is removed and its peroxide content determined as follows: The 0.25-gram sample is finely chopped and placed in a 250-ml. Erlenmeyer flask containing 20 ml. carbon tetrachloride. The flask with its contents is then heated on a steam bath just below the boiling point for 25 minutes with frequent swirling. To this hot solution is added 20 ml. of a 60% glacial acetic acid/40% chloroform mixture. One ml. of a saturated aqueous potassium iodide is added, and the flask is then stoppered and agitated for 2 minutes in subdued light. Distilled water (100 ml.) is then added, and the iodine is titrated with 0.002 N sodium thiosulfate, using 2 ml. of starch indicator solution (1%). It is necessary to shake the sample well toward the end point. The peroxide content is then reported as the milliequivalents of peroxide per kilogram of sample. The calculations are as follows:

$$\text{Milliequivalent peroxides} = \frac{\text{ml. Na}_2\text{S}_2\text{O}_3 \text{ solution} \times \text{normality} \times 1000}{\text{gram sample}}$$

$$= \frac{\text{ml.} \times 0.002 \times 1000}{0.25} = \text{ml.} \times 8$$

Upon completion of this test, the oven life "thermal stability" is measured as the number of hours before peroxides are first observed.

During the oven storage test of polyethylene samples three visual observations should be made: (1) the color of the polyethylene samples both before and during the test: (2) the viscosity breakdown, that is, the ability of the samples to contain themselves rather than to continually spread out as a thin film on the watchglasses: and (3) the solubility of the polyethylene samples in carbon tetrachloride during the peroxide test. These properties are particularly important since viscosity breakdown and poor solubility in carbon tetrachloride indicate that the initial start of peroxide build-up has been passed. When this occurs the peroxide value is usually low, because of the conversion to acids and other oxidation products.

Using the oven stability test described above, samples of various polymerized α-mono-olefins were tested and results are presented in the following tables:

TABLE I

| Antioxidant used in the amount of 1% by weight in Polyethylene | Color during Oven Test | Oven Life, Hrs. at 140° C. |
|---|---|---|
| Control (no antioxidant) | good | 7 |
| BHA | fair | 18 |
| 2-tert.butyl-4-decyloxyphenol | good | 105 |
| 2-tert.butyl-4-dodecyloxyphenol | do | >280 |
| 2-tert.butyl-4-tetradecyloxyphenol | do | >200 |
| 2-tert.butyl-4-octadecyloxyphenol | do | >166 |

Similar results were obtained using 2-tert.octyl-4-dodecyloxyphenol.

TABLE II

| Antioxidant used in Polypropylene | Percent by weight | Oven Life, Hrs. at 140° C. |
|---|---|---|
| Control (no antioxidant) | | 0.5 |
| 2-tert.butyl-4-dodecyloxyphenol | 0.5 | 17.0 |
| 2-tert.butyl-4-dodecyloxyphenol | 1.0 | 67.0 |

Similar results were obtained in regard to other polymerized α-mono-olefins and other stabilizers covered by the above description.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A stabilized composition of matter normally subject to thermal oxidative degradation consisting of a normally solid polymer selected from the group consisting of polyethylene and polypropylene and from about 0.001% to about 3% by weight of a stabilizer selected from the group consisting of those compounds having the following formulas:

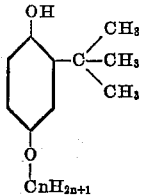 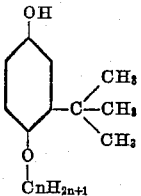

wherein *n* is an integer of from 12 to 18, inclusive.

2. A stabilized composition as defined in claim 1 wherein the polymer is polyethylene and the stabilizer is 2-tert.-butyl-4-dodecyloxyphenol.

3. A stabilized composition as defined in claim 1 wherein the polymer is polyethylene and the stabilizer is 2-tert.-butyl-4-tetradecyloxyphenol.

4. A stabilized composition as defined in claim 1 wherein the polymer is polyethylene and the stabilizer is 2-tert.-butyl-4-octadecyloxyphenol.

5. A stabilized composition as defined in claim 1 wherein the polymer is polypropylene and the stabilizer is 2-tert.-butyl-4-dodecyloxyphenol.

6. A stabilized plastic composition at a temperature above 140° C. which is normally subject to thermal oxidative deterioration consisting of a normally solid polymer selected from the group consisting of polyethylene and polypropylene and from about 0.001% to about 3% by weight of a stabilizer selected from the group consisting of those compounds having the following formulas:

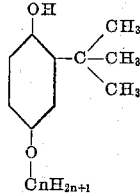 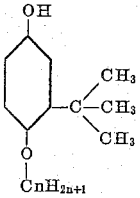

wherein *n* is an integer of from 12 to 18, inclusive.

7. A process for shaping a plastic composition consisting of a normally solid polymer selected from the group consisting of polyethylene and polypropylene which is normally subject to thermal oxidative deterioration which comprises mixing and plasticating said polymer at a temperature of at least 140° C. with from about 0.001% to about 3% by weight of a stabilizer selected from the group consisting of those compounds having the following formulas:

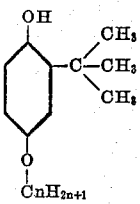 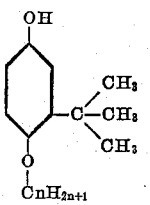

wherein *n* is an integer of from 12 to 18, inclusive and forming the plastic mass into a shaped object at an elevated temperature at which said polymer is normally subject to thermal oxidative deterioration.

References Cited in the file of this patent

UNITED STATES PATENTS

| 2,704,724 | Chenicek | Mar. 27, 1955 |
| 2,835,650 | Nelson et al. | May 20, 1958 |